(12) United States Patent
Kavarana

(10) Patent No.: US 12,697,876 B2
(45) Date of Patent: Aug. 4, 2026

(54) VEHICLE AUDIO CONTROL DEVICE

(71) Applicant: NISSAN NORTH AMERICA, INC.,
Franklin, TN (US)

(72) Inventor: Farokh Kavarana, Novi, MI (US)

(73) Assignee: NISSAN NORTH AMERICA, INC.,
Franklin, TN (US)

( * ) Notice: Subject to any disclaimer, the term of this
patent is extended or adjusted under 35
U.S.C. 154(b) by 178 days.

(21) Appl. No.: 18/592,015

(22) Filed: Feb. 29, 2024

(65) Prior Publication Data

US 2025/0276579 A1 Sep. 4, 2025

(51) Int. Cl.
*B60K 35/26* (2024.01)
*B60K 35/21* (2024.01)
(52) U.S. Cl.
CPC ............ *B60K 35/26* (2024.01); *B60K 35/213*
(2024.01); *B60K 2360/151* (2024.01)
(58) Field of Classification Search
CPC . B60K 35/26; B60K 35/213; B60K 2360/151
See application file for complete search history.

(56) References Cited

U.S. PATENT DOCUMENTS 10,841,698 B1* 11/2020 Janampally ............. G10L 25/51
11,813,981 B2 11/2023 Vangelov et al.

2018/0090125 A1* 3/2018 Yeung ...................... B60Q 9/00
2022/0185178 A1* 6/2022 Sudo ...................... B60K 35/22
2024/0067084 A1* 2/2024 Menne ..................... H04R 3/14
2025/0166429 A1* 5/2025 Omotani ............... B60K 35/22

FOREIGN PATENT DOCUMENTS

CN 109177901 B 7/2020
WO 2019061595 A1 4/2019

* cited by examiner

*Primary Examiner* — Stella L. Woo

(74) *Attorney, Agent, or Firm* — Spencer Fane, LLP

(57) ABSTRACT

A vehicle audio control device includes an electronic controller, a computer-readable medium and an audiovisual system. The electronic controller is programmed to be in communication with a sensor system of an electrified vehicle to receive signals from the sensor system regarding a state of the electrified vehicle during a vehicle drive cycle. The computer-readable medium stores a plurality sound outputs. Each of the sound outputs corresponds to one or more states of the vehicle drive cycle. The user interface is operable to set the sound outputs with respect to the one or more states of the vehicle drive cycle. The audiovisual system has at least one speaker controlled by the electronic controller to generate the sound outputs when the electrified vehicle is in the corresponding state of the vehicle drive cycle.

13 Claims, 5 Drawing Sheets

| YOUR SOUNDS, YOUR WAY ...... | | | | |
|---|---|---|---|---|
| State of Drive Cycle | Sound On/Off | Sound Output Selection | Sound Volume | Sound Response |
| Key On (Start) | ☒ | Sunrise Glow ▽ | ))) ═◉═══ | |
| Idle (0 mph) | ☒ | Silver Waltz ▽ | ))) ═◉═══ | |
| Acceleration | ☒ | Roaring River ▽ | ))) ═◉═══ | ⟲ ──⬤── ⟳ |
| Cruising | ☐ | | | |
| Deceleration | ☒ | Vivid Flares ▽ | ))) ═◉═══ | ⟲ ──⬤── ⟳ |
| Key Off (Stop) | ☒ | Sunset Haze ▽ | ))) ═◉═══ | |
| Exterior (AVAS) | Always ON | Canto Blitz ▽ | | |

YOUR SOUNDS, YOUR WAY ......

| State of Drive Cycle | Sound On/Off | Sound Output Selection | Sound Volume | Sound Response |
|---|---|---|---|---|
| Key On (Start) | ☒ | Sunrise Glow ▷ | | |
| Idle (0 mph) | ☒ | Silver Waltz ▷ | | |
| Acceleration | ☒ | Roaring River ▷ | | |
| Cruising | ☐ | | | |
| Deceleration | ☒ | Vivid Flares ▷ | | |
| Key Off (Stop) | ☒ | Sunset Haze ▷ | | |
| Exterior (AVAS) | Always ON | Canto Blitz ▷ | | |

VEHICLE AUDIO CONTROL DEVICE

BACKGROUND

Technical Field

The present disclosure generally relates to a vehicle audio control device. More specifically, the present disclosure relates to a vehicle audio control device that allows for customized sound selections during vehicle driving.

Background Information

Electrified vehicles use of one or more electric motors alone or in combination with an internal combustion engine to power the vehicle and often include transmissions or gear boxes such as a continuously variable transmission or power split arrangement that do not include discreet gear ratios associated with conventional manual or automatic transmissions. Active sound designs can be implemented for electric vehicles to create consistent acoustic feedback for the driver, reflecting driving conditions (acceleration, braking, etc.), which is absent in electrified vehicles.

SUMMARY

In view of the state of the known technology, an aspect of the present disclosure is to provide a vehicle audio control device comprising an electronic controller, a computer-readable medium and an audiovisual system. The electronic controller is programmed to be in communication with a sensor system of an electrified vehicle to receive signals from the sensor system regarding a state of the electrified vehicle during a vehicle drive cycle. The computer-readable medium stores a plurality sound outputs. Each of the sound outputs corresponds to one or more states of the vehicle drive cycle. The user interface is operable to set the sound outputs with respect to the one or more states of the vehicle drive cycle. The audiovisual system has at least one speaker controlled by the electronic controller to generate the sound outputs when the electrified vehicle is in the corresponding state of the vehicle drive cycle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
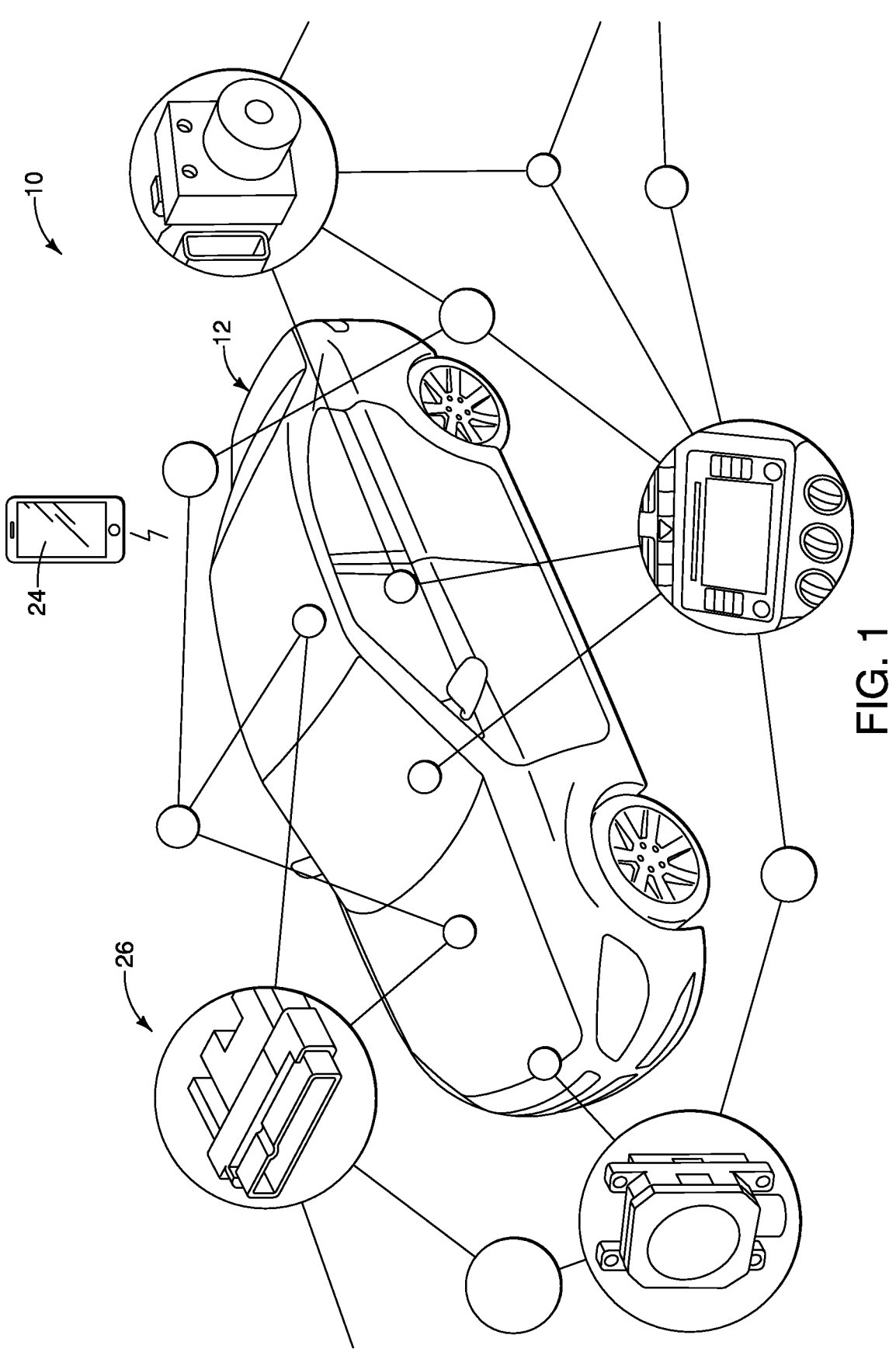
FIG. 1 is a schematic overview of a vehicle having a vehicle audio control device implemented therein in accordance with an illustrated embodiment.
Figure 2:
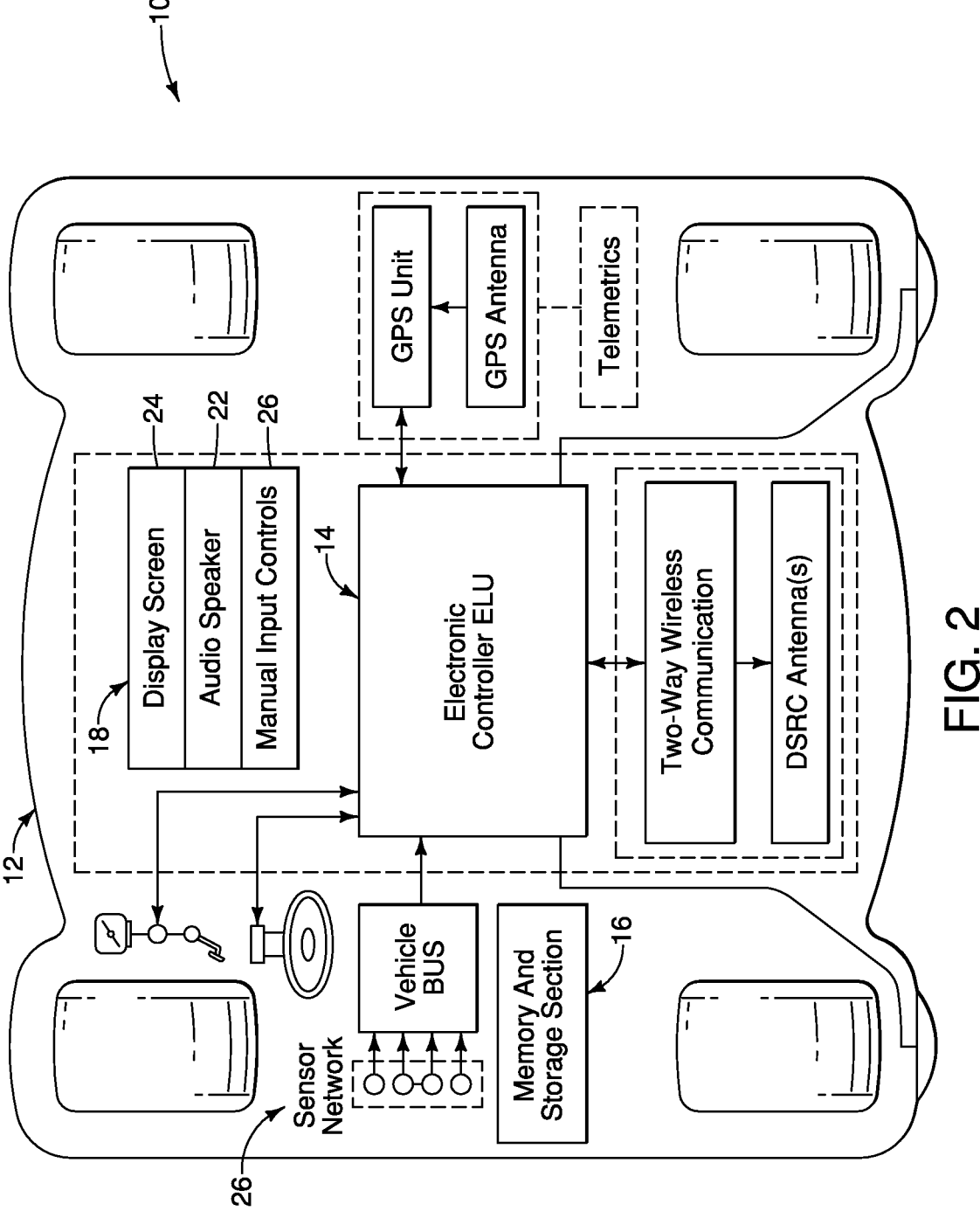
FIG. 2 is a schematic view of the vehicle audio control device.

Referring initially to FIGS. 1 and 2, a vehicle audio control device 10 is illustrated in accordance with an embodiment. The vehicle audio control device 10 can be provided or implemented with an electrified vehicle 12. In the illustrated embodiment, the vehicle audio control device 10 preferably further comprises the electrified vehicle 12. The electrified vehicle 12 can be an electric vehicle (EV) or a hybrid electric vehicle (HEV). That is, the electrified vehicle 12 can be a battery operated electric vehicle powered only by a battery and one or more electric machines that may be operated as a motor/generator selectively drawing power from or charging a high voltage battery (not shown). Alternatively, the vehicle audio control device 10 can be implemented with an HEV powered by an internal combustion engine in combination with one or more electric machines that may each operate as a motor and/or generator. The vehicle audio control device 10 can be implemented with various types of passenger vehicles, such as crossover utility vehicle (CUV or XUV), sport utility vehicle (SUV), truck, recreational vehicle (RV), etc. including driver operated, driver-assisted, and fully autonomous configurations for transporting people or goods.

Additionally, the vehicle audio control device 10 further comprises an electronic controller 14 and a computer-readable medium 16 that can control an audiovisual system 18 of the vehicle. The audiovisual system 18 includes at least one user interface 20 and a speaker system 22 of the electrified vehicle 12. The audiovisual system 18 preferably further includes at least one electronic display 24. The speaker system 22 includes at least one speaker of the electrified vehicle 12. The electronic controller 14 is in communication with a sensor system 26 of the electrified vehicle 12 to receive information regarding a state of the electrified vehicle 12 during a vehicle drive cycle as will be further explained.

The electronic controller 14 further controls the user interface 20, the electronic display 24, and the speaker system 22 of the electrified vehicle 12 in accordance with the current vehicle drive cycle. In particular, the vehicle audio control device 10 enables the speaker system 22 to play sounds corresponding to pre-selected sounds during different events of a vehicle drive cycle as will be further described below. Thus, the vehicle audio control device 10 allows for customizable sound generation in the electrified vehicle 12 throughout different states of the electrified vehicle's 12 drive cycle. The term "drive cycle" as used herein refers to a series of driving states or events of the electric vehicle 12 during instances of use. Each drive cycle can vary and include different states or events of the vehicle 12.

Figure 3:
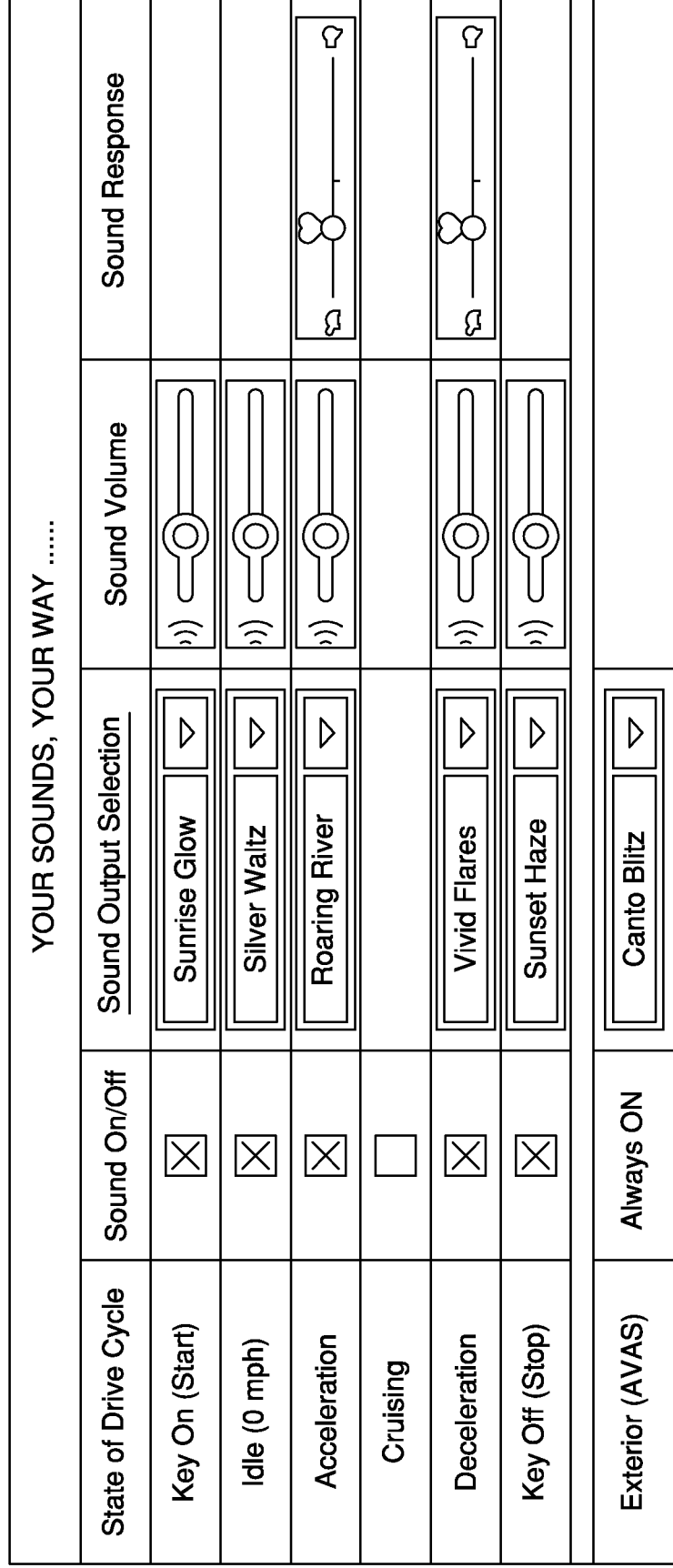
FIG. 3 is a sample of information displayed for the vehicle audio control device.

The vehicle 12 undergoes different behaviors under different circumstances and encounters. The at least one electronic display 24 that is preferably positioned in an interior compartment of the vehicle 12 as part of the console. The electronic display 24 can also be a heads-up display on the vehicle's 12 windshield. Alternatively, the electronic display 24 can include or be a mobile device that is in electronic communication with the electronic controller 14 to display information regarding the audiovisual system 18. The display 24 can include a single type display, or multiple display types (e.g., both audio and visual) configured for human-machine interaction. The electronic display 24 displays different information regarding the sound outputs for the vehicle audio control device 10, as seen in FIG. 3.

The user interface 20 is operable to set the sound outputs with respect to the one or more states of the vehicle drive cycle. Therefore, the electronic controller 14 can receive user inputs from the vehicle 12 occupants via the user interface 20 to set the desired sound output as will be described below. The user interface 20 can be part of or integral with the electronic display 24 which can include, for example, control buttons and/or control buttons displayed on a touchscreen display which enable the user to enter commands and information, as seen in FIG. 3. Alternatively, the user interface 20 can be provided as part of the steering wheel audio buttons, a push-to-talk button (e.g., hard buttons and/or soft buttons), instrument panel controls, etc. Alternatively, the user interface 20 can be provided on a mobile device that is in communication with the electronic controller 14.

The electronic controller 14 is in communication with the at least one speaker of the audiovisual system 18 to provide sound output to vehicle occupants. The vehicle audio control device 10 is provided as an active sound system to create consistent acoustic feedback for the driver, reflecting driving conditions (acceleration, braking, etc.), which is absent in electrified vehicles that lack powertrain noise. The vehicle audio control device 10 can control interior speakers of the electrified vehicle 12 for the passenger to compensate for the lack of acoustic feedback and increase driving pleasure. Secondly, new noise sources that have become apparent can be partially masked by enhancing the sound and providing the right driving experience. Therefore, the vehicle audio control device 10 enables driving the electrified vehicle 12 to have the perception of driving a sporty car just by playing the right active sound over the speaker system 22. Additionally, the vehicle audio control device 10 of the illustrated embedment can control exterior speakers of the electrified vehicle 12 to generate sounds for exterior vehicles in the vicinity of the electrified vehicle 12 that can help the electrified vehicle 12 meet current legal requirement of acoustic vehicle alerting systems (AVAS) in electrified vehicle 12s to achieve minimal noise levels.

As stated, the electronic controller 14 is programmed to be in communication with the sensor system 26 to receive signals from the sensor system 26 regarding a state of the electrified vehicle 12 during a vehicle drive cycle. In the illustrated embodiment, the sensor system 26 can include a controller area network (CAN-bus) system that is a message-based protocol designed to allow the electronic control units (ECUs) found in automobiles, as well as other devices, to communicate with each other in a reliable, priority-driven fashion.

Various sensor inputs from around the vehicle (speed sensors, steering angle, air conditioning on/off, engine temperature) are collated via the CAN-bus, as illustrated in FIG. 1. For example, the electronic controller 14 can monitor signals from the CAN-bus to receive signals from the accelerator pedal sensor to monitor a degree of accelerator opening, the brake pressure sensor to determine deceleration, the engine/motor rotation sensor to determine vehicle speed, etc. Therefore, the electronic controller 14 can receive signals regarding the accelerator pedal position, the vehicle speed, the motor speed, the motor torque, and/or sensed vibrations. Therefore, the signals from the sensor system 26 provide information regarding a state of the drive cycle of the vehicle 10 such as acceleration, deceleration, coasting, sport mode, etc. Additionally, the electronic controller 14 can receive signals from the start/stop system of the electrified vehicle 12 if the electrified vehicle 12 is an HEV to determine whether the vehicle 12 is at a stop or stationary. In the illustrated embodiment, the sound outputs are active sounds created by real-time sound synthesis based on the CAN-bus input signals.

The electronic controller 14 can also be in communication with the vehicle's 12 electric park brakes, the park assist systems, auto lane assist/collision avoidance systems to determine whether the vehicle is parking, changing lanes, turning, etc. It will be apparent to those skilled in the vehicle field from this disclosure that the vehicle audio control device 10 can be in communication with other types of sensors and positioning systems of the vehicle (e.g., cameras, bumper sensors, radar, antennas, the global positioning unit, telemetric, etc.) to control the speaker system 22 to generate different sounds according to different information received from these systems. Therefore, the electronic controller 14 is programmed to be in communication with the sensor system 26 to receive signals from the sensor system 26 regarding a state of the electrified vehicle 12 during a vehicle drive cycle.

As stated, the electronic controller 14 controls the audiovisual system 18 in accordance with the drive cycle. That is, the electronic controller 14 can control the speakers to broadcast sounds through the speakers based on the current state of the vehicle 12 in the drive cycle. For example, when the state of the drive cycle is that the vehicle 12 is in park or neutral the electronic controller 14 can control the speakers to play a desired sound, such as an iconic engine idle sound. When the vehicle 12 then accelerates, the electronic controller 14 can determine that the state of the drive cycle is that the vehicle 12 is accelerating based on the accelerator pedal position and control the speakers to generate a desired sound such as revving of the engine. Therefore, the sound generated by the speakers transitions from a neutral sound to a revving sound as the vehicle 12 transitions between different states in the drive cycle.

In the illustrated embodiment, the sound outputs are customizable via the user interface 20 that is operable by the user to set the sound outputs with respect to the one or more states of the vehicle drive cycle. The selections for the sound outputs are displayed on the electronic display 24. Thus, the electronic display 24 is programmed to display a selection of the sound outputs with respect to the one or more states of the vehicle drive cycle. The user can select a desired sound output (e.g., idling sound) for when the vehicle 12 is at an idle state. The user can select another desired sound output for when the vehicle 12 is at an acceleration state (e.g., revving sound) and when the vehicle 12 is at a cruising state (e.g., desired music). Therefore, the speakers are controlled by the electronic controller 14 to generate the sound outputs when the electrified vehicle 12 is in the corresponding state of the vehicle drive cycle.

The state of the drive cycle can include, but is not limited to, an ON/OFF event, an acceleration state event, a turning state event, a lane changing event, a cruising event, a deceleration event, a parking event, a stop event, a cruising event. Therefore, the state of the electrified vehicle drive cycle includes any one or more of a vehicle ON event, a vehicle OFF event, a start event, a stop event and a vehicle drive event. In the illustrated embodiment, the vehicle drive event includes any one or more of an acceleration event, a deceleration event, a reverse event, a turning event, a lane change event, a cruising event and an idle event. The vehicle audio control device 10 of the illustrated embodiment allows the user to control when they hear the desired sound output. For example, the user can set the vehicle control device to play only a desired sound during an acceleration event but not while cruising at constant speed on highway. The user can also customize sound during a deceleration event to either play a desired sound output or to be entirely OFF.

Figure 4:
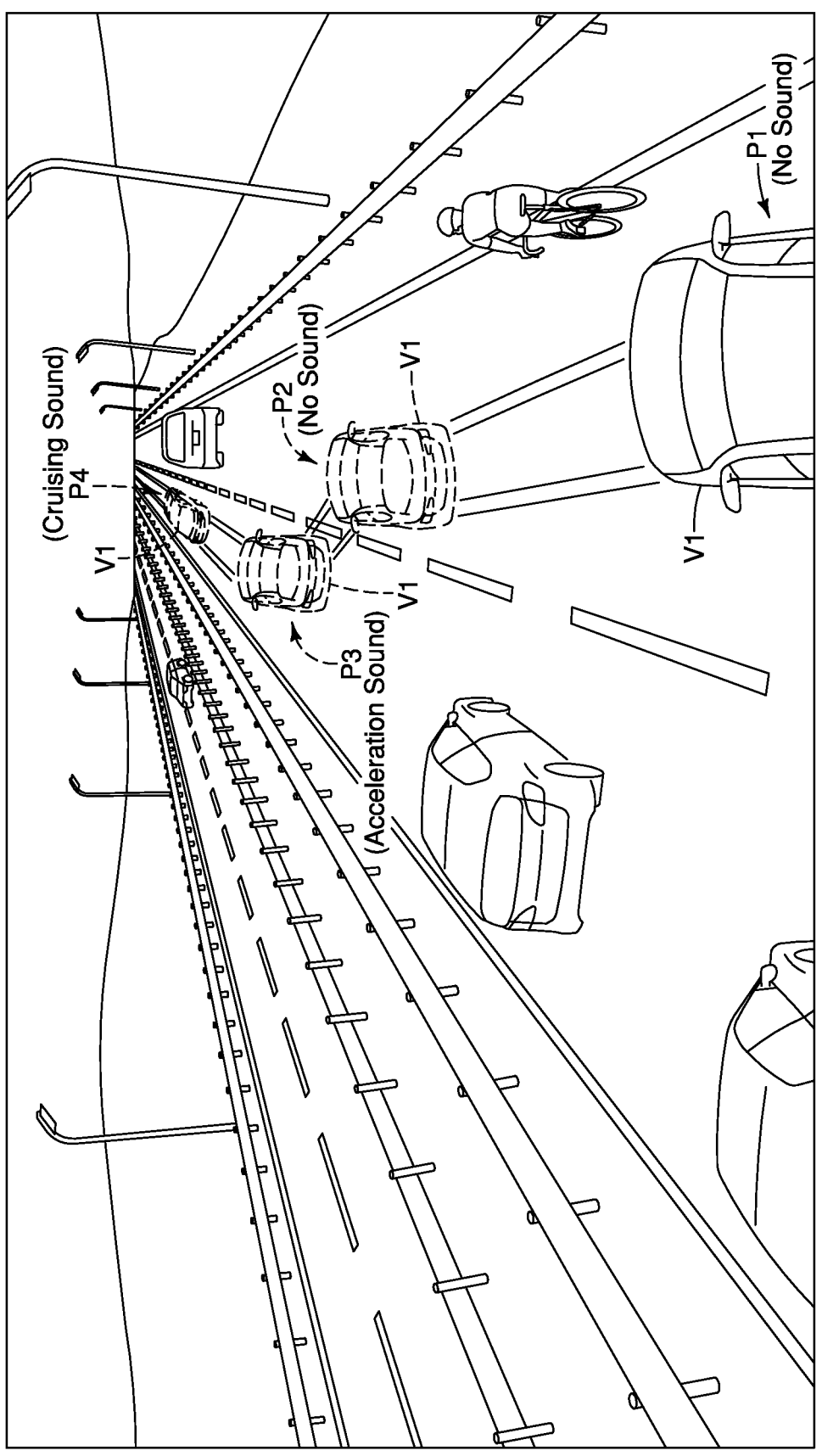
FIG. 4 is a sample vehicle drive cycle for a vehicle having the vehicle audio control device implemented therein.

For example, as seen in FIG. 4, the vehicle V1 is an example of a vehicle that is provided with the vehicle audio control device 10. The vehicle V1 is decelerating at P1 to avoid the cyclist, the vehicle V1 is undergoing a lane change at P2, accelerating after the lane change at P3 and then cruising at P4. Therefore, the vehicle V1 is undergoing a deceleration event, a lane change event, an acceleration event and a cruising event. The vehicle audio control device 10 can be set to not play any sounds during lane changes or deceleration events (at P1 or P2), but to play a desired sound or music during the acceleration event and the cruising event (at P3 and P4). Therefore, the electronic controller 14 can control the speakers to be silent during deceleration and lane change but to resume sounds during acceleration and cruising.

Figure 5:
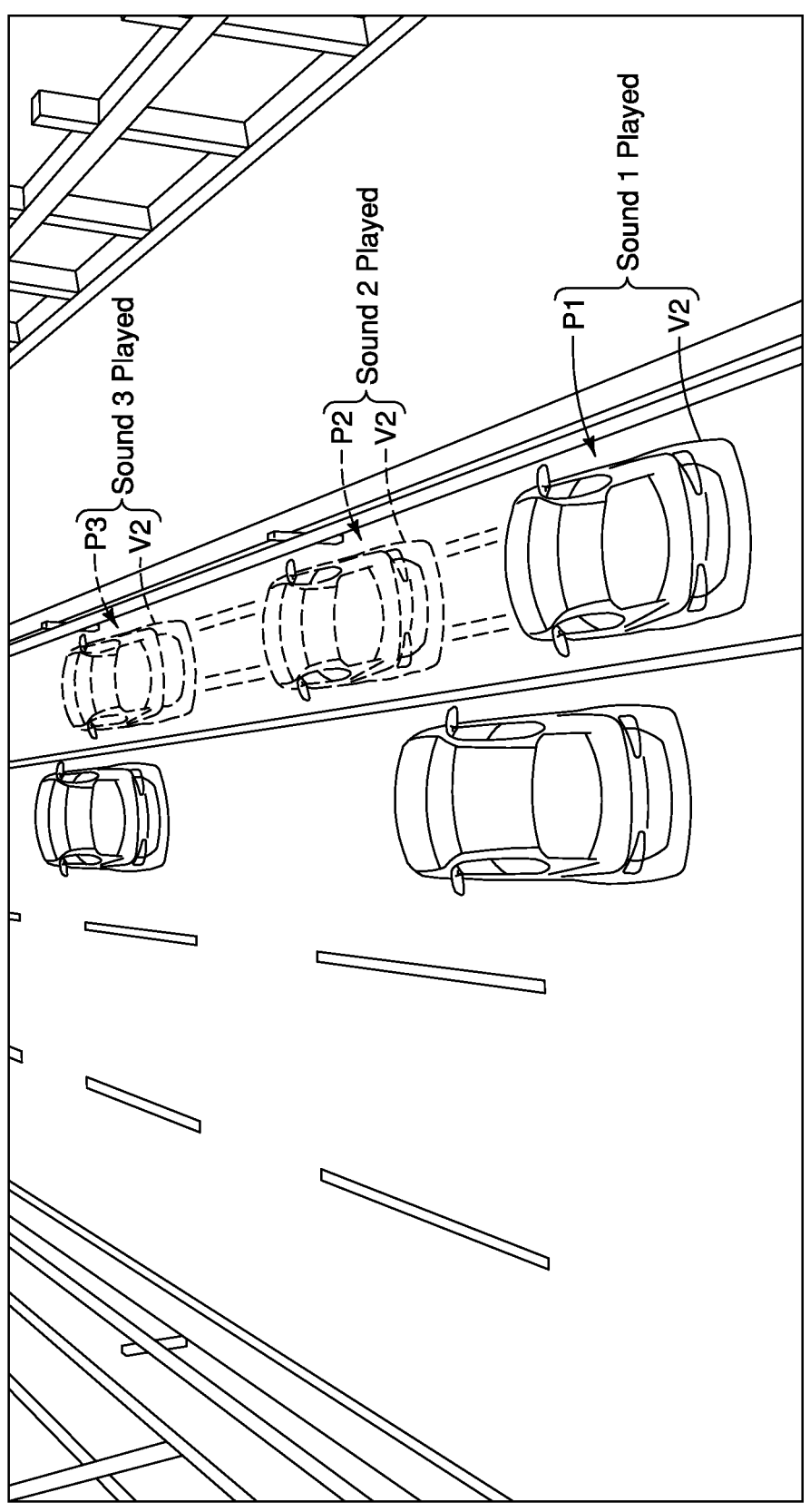
FIG. 5 is another sample vehicle drive cycle for another vehicle having the vehicle audio control device implemented therein.

Referring to FIG. 5 in another example, the vehicle V2 is another example of a vehicle that is provided with the vehicle audio control device 10. The vehicle V2 is decelerating at P100, idling at P200 and parking at P300. The vehicle audio control device 10 can control the speakers to generate different sound outputs or be entirely OFF at any of these changing states of the vehicle drive cycle in accordance with user customization. Therefore, the electronic controller 14 is programmed to control the at least one speaker to change the sound output that is generated based on a change in the state of the electric vehicle drive cycle.

The electronic controller 14 includes a processor or CPU that controls the operation of the vehicle control apparatus. As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

The electronic controller 14 further has a computer readable medium storing the sound output options. As used herein, the terminology "memory" or "computer-readable medium 16" (also referred to as a processor-readable medium) indicates any computer-usable or computer-readable medium 16 or device that can tangibly contain, store, communicate, or transport any signal or information that may be used by or in connection with any processor. For example, the computer-readable medium 16 may be one or more read only memories (ROM), one or more random access memories (RAM), one or more registers, low power double data rate (LPDDR) memories, one or more cache memories, one or more semiconductor computer readable medium devices, one or more magnetic media, one or more optical media, one or more magneto-optical media, or any combination thereof.

Therefore, the computer-readable medium 16 further includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media can include, for example, optical or magnetic disks and other persistent computer readable medium. Volatile media may include, for example, dynamic random access computer readable medium (DRAM), which typically constitutes a main computer readable medium.

The computer-readable medium 16 can also be provided in the form of one or more solid state drives, one or more computer readable medium cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The computer-readable medium 16 comprises a plurality sound outputs, each of the sound outputs corresponding to one or more states of the vehicle drive cycle. As seen in FIG. 3, the electronic display 24 can display options for the sound outputs that is stored in the computer-readable medium 16. In the illustrated example, the sound outputs are depicted as "sound output selection" on the electronic display 24, with each sound output corresponding to different driving states or events so to be played at those different driving states or events. The sound outputs can be prestored in the computer-readable medium 16 or stored on a cloud for which the user has access via a subscription service. Therefore, the sound outputs can be provided via over-the-air (OTA) updates or a subscription service.

The electronic controller 14 can be further programmed create a plurality of sound profiles, each of the sound profiles corresponding with one or more states of the vehicle drive cycle. Therefore, each state of the drive cycle has a sound profile which includes customized settings for ON/OFF, sound selection, sound volume, and/or sound responses for the specific drive state or event.

The processor of the electronic controller 14 can execute instructions transmitted by one or more transmission media, including coaxial cables, copper wire and fiber optics, including the wires that comprise a system bus coupled to a processor of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in computer readable medium that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor receives instructions from the computer-readable medium 16 and executes these instructions, thereby performing one or more processes, including one or more of the processes described herein. Such instructions and other data may be stored and transmitted using a variety of computer-readable media.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle audio control device comprising:
an electronic controller programmed to be in communication with a sensor system of an electrified vehicle to receive signals from the sensor system regarding a state of the electrified vehicle during a vehicle drive cycle;
a computer-readable medium comprising a plurality sound outputs, each of the sound outputs corresponding to one or more states of the vehicle drive cycle;
a user interface operable to set the sound outputs with respect to the one or more states of the vehicle drive cycle; and
an audiovisual system having at least one speaker controlled by the electronic controller to generate the sound outputs when the electrified vehicle is in the corresponding state of the vehicle drive cycle,
each of the one or more states of the vehicle drive cycle having a sound profile which includes customized settings for at least one selected from the group consisting of: an on/off selection for volume, a selection of one of the plurality of sound outputs, a sound volume, and a sound response.

2. The vehicle audio control device according to claim 1, wherein
the state of the vehicle drive cycle includes any one or more of a vehicle ON event, a vehicle OFF event, a start event, a stop event and a vehicle drive event.

3. The vehicle audio control device according to claim 2, wherein
the vehicle drive event includes any one or more of an acceleration event, a deceleration event, a reverse event, a turning event, a lane change event, a cruising event and an idle event.

4. The vehicle audio control device according to claim 3, wherein
the electronic controller is programmed to control the at least one speaker to change the sound output that is generated based on a change in the state of the vehicle drive cycle.

5. The vehicle audio control device according to claim 4, further comprising
the electrified vehicle.

6. The vehicle audio control device according to claim 5, wherein
the audiovisual system includes at least one electronic display programmed to display a selection for sound outputs with respect to the one or more states of the vehicle drive cycle.

7. The vehicle audio control device according to claim 6, wherein
the electronic controller is programmed to create the plurality of sound profiles.

8. The vehicle audio control device according to claim 2, wherein
the electronic controller is programmed to control the at least one speaker to change the sound output that is generated based on a change in the state of the vehicle drive cycle.

9. The vehicle audio control device according to claim 8, further comprising
the electrified vehicle.

10. The vehicle audio control device according to claim 9, wherein
the audiovisual system includes at least one electronic display programmed to display a selection of the sound outputs with respect to the one or more states of the vehicle drive cycle.

11. The vehicle audio control device according to claim 10, wherein
the electronic controller is programmed to create the plurality of sound profiles.

12. The vehicle audio control device according to claim 1, wherein
the sound outputs are customizable via the user interface.

13. The vehicle audio control device according to claim 1, wherein
the sound profile for each of the one or more states of the vehicle drive cycle is customizable via the user interface.

* * * * *